United States Patent [19]
Askman et al.

[11] Patent Number: 5,509,350
[45] Date of Patent: Apr. 23, 1996

[54] MACHINE FOR LAYERING STRIPS OF FOOD MATERIAL

[75] Inventors: Lars Askman, Billesholm; Anders B. Ganrot, Bjuv; Werner Leonhardt, Astorp, all of Sweden

[73] Assignee: Nestec S.A., Vevey, Switzerland

[21] Appl. No.: 287,181

[22] Filed: Aug. 8, 1994

[30] Foreign Application Priority Data

Sep. 3, 1993 [EP] European Pat. Off. ............ 93114125

[51] Int. Cl.[6] .................. A21C 9/04; A23L 1/16; A23P 1/00
[52] U.S. Cl. ................. 99/450.2; 99/353; 99/450.6; 425/6; 425/131.1
[58] Field of Search ................. 99/450.1, 353, 99/450.2, 494, 355, 483, 479, 386, 443 C; 425/6, 131.1, 112; 426/523, 302, 275, 502

[56] References Cited

U.S. PATENT DOCUMENTS 3,670,665  6/1972  Levi .
4,569,849  2/1986  Codino .
4,992,285  2/1991  Larsen .

Primary Examiner—Timothy F. Simone
Attorney, Agent, or Firm—Vogt & O'Donnell

[57] ABSTRACT

An apparatus for preparation of a layered food product has two conveyor belts, wherein a first conveyor belt is positioned beneath a second conveyor belt, and has a first guide for guiding a plurality of strips of a food material so that one strip is guided onto the first conveyor belt and another strip is guided to the second conveyor belt for transport by the conveyor belts. The conveyor belts extend so that the second conveyor belt has an end positioned above the first conveyor belt at a position between the ends of the first conveyor belt, and a product-forming strip guide is positioned to guide a strip delivered from the end of the second conveyor belt for deposit onto a strip transported on the first conveyor belt for forming a layered food product. A plurality of further conveyor belts may be positioned above the first conveyor belt and parallel to the second conveyor belt for transporting and delivering further strips to further product-forming strip guides for depositing the further strips sequentially onto the layered food product transported on the first conveyor.

12 Claims, 2 Drawing Sheets

MACHINE FOR LAYERING STRIPS OF FOOD MATERIAL

BACKGROUND OF THE INVENTION

The present invention relates to a machine and method for the continuous layering of strips of food material, more particularly for the continuous production of lasagne by forming strips of pasta in layers, inserting a filling between the layers and cutting into portions automatically.

Normally, in the production of lasagne, the pasta is extruded, cut into strips of a suitable width, blanched, cut, and placed piece by piece into a tray by hand with a filling of sauce between the pieces. This process has the following disadvantages:

1) The pasta processing line is unduly long and occupies a great deal of space.

2) The process is labour intensive and requires at least five people on the line.

3) The pasta is extremely slippery and difficult to handle.

4) There are losses of pasta as a result of a lack of time for the operator to transport all the pieces of pasta to the tray.

5) There are several moving parts in the machine for transporting and layering the pasta strips, which are prone to break down or wear out.

SUMMARY OF THE INVENTION

We have developed a machine and method for the continuous layering of strips of food material which occupies less than half the length of a conventional machine, is labour saving, has no moving parts except for the basic conveyor which reduces or eliminates the costs for exchange of machine parts or possible shutdowns, and substantially prevents any losses in pasta.

According to the present invention, there is provided a machine for layering strips of food material comprising:

a) means for forming a plurality of parallel strips of flexible food material, b) one lower conveyor belt, herein also the "first conveyor belt", and at least one upper conveyor belt, herein also the "second conveyor belt" and "further conveyor belts", extending to a downstream end overlying the lower conveyor belt, c) a first guiding means for guiding one strip of flexible food material for delivery onto the lower conveyor belt and for guiding the further strip or strips of the plurality of strips for delivery onto the upper conveyor belt or belts, d) power means adapted to advance the conveyor belts for transporting the strips downstream, and e) a product-forming strip guiding means for guiding a strip of flexible food material transported from the downstream end of an upper conveyor belt so that the strip is deposited to lie above another strip transported downstream by the lower conveyor belt thereby forming a food product comprising layered strips of food material.

The process of the present invention comprises:

a) forming a plurality of parallel strips of flexible food material, b) guiding one strip of flexible food material to a lower first conveyor belt and one other strip of flexible food material to an upper, second conveyor belt, the upper conveyor belt extending to a downstream end overlying the lower conveyor belt, c) advancing the conveyor belts for transporting the strips downstream, and d) guiding the strip transported by the upper conveyor belt and delivered from its downstream end to lie upon the strip transported downstream on the lower conveyor belt to form layered sheets of food material.

A plurality of further strips may be guided to and transported and delivered by a plurality of further upper conveyors and be guided sequentially to lie upon the previously layered sheets.

DETAILED DESCRIPTION OF THE INVENTION

In accordance with the present invention, the strips of flexible food material employed may be, for instance, strips of pasta which may be formed by any conventional means, e.g., where the pasta dough is extruded from a kneader/sheeter to give a strand which is passed onto a conveyor belt which transports the strand through a blanching tank containing hot water and then out of the blanching tank onto a conveyor.

Advantageously, the conveyor which transports the blanched pasta may conveniently be a cooling conveyor belt, and one or more cutting devices, e.g. rotating circular knives, adapted to cut the pasta strand longitudinally into a plurality of strips lying side by side, is/are positioned above the conveyor. The usual number of strips cut is from three to six for a lasagne, but a larger number of strips may be used for some products, e.g. up to 11.

The number of upper conveyor belts is conveniently the same as the number of strips which is intended to lie over the strip lying on the lower conveyor, i.e., one less than the total number of strips forming the layers of the food product. When there are a plurality of upper conveyors, they are advantageously positioned parallel to one another and have different lengths, so that the layering is a sequential operation in that the shortest one transports and delivers a strip for deposit onto the first strip lying on the lower conveyor belt, the next shortest transports and delivers a further strip for deposit onto the strip which has been deposited from the shortest upper conveyor belt, and so on, sequentially, until the longest upper conveyor belt transports and delivers the strip which is deposited to form the top layer of the food product.

The guiding means to guide the strips of flexible food material for delivery onto the lower and upper conveyor belts, respectively, may conveniently be rollers around which the strips are trained.

The power means adapted to advance the conveyor belts for transport of the strips downstream may be any conventional means, e.g. an electric motor. Although one motor may be used to drive all the belts, it is preferable that separate motors are used to drive the cooling conveyor, the upper conveyor and the lower conveyor belts because it is desirable that the speed of each conveyor is individually adjustable. Although the conveyors travel at approximately the same speed, there is normally a slight speed increase from the cooling conveyor to the upper conveyor and from the upper conveyor to the lower conveyor.

The product-forming strip guiding means, which guides a strip of flexible food material delivered from the downstream end of an upper conveyor belt so that the strip is deposited to lie above another strip advancing downstream on the lower conveyor belt to form the layered product, may suitably be a roller around which the strip is trained.

Advantageously, means are provided for depositing a filling between the layers of the food product. Such means may be provided by a filling nozzle positioned upstream of the product-forming strip guiding means. For a product having more than one or two layers of strips with a filling between each layer, there are conveniently a plurality of filling nozzles arranged successively, the number of nozzles corresponding to the number of layers of filling. Particularly when a filling is deposited, the product-forming strip guiding means suitably may be a calibrating roller around which the strip is trained and which is positioned and adjustable to control the thickness of the filling.

The filling may be, for instance, a sauce or other conventional filling for a lasagne, e.g. using a meat, fish, vegetable or meat base.

Preferably, a cutting means is provided for cutting the food product transversely to its direction of travel and is advantageously situated above the lower conveyor downstream of the position where the top layer has been deposited onto the food product.

The present invention may be fully automated and may be synchronized and electronically controlled by a computer.

The present invention is illustrated further by way of example with reference to the accompanying drawings.

DETAILED DESCRIPTION OF THE DRAWINGS

Figure 1:
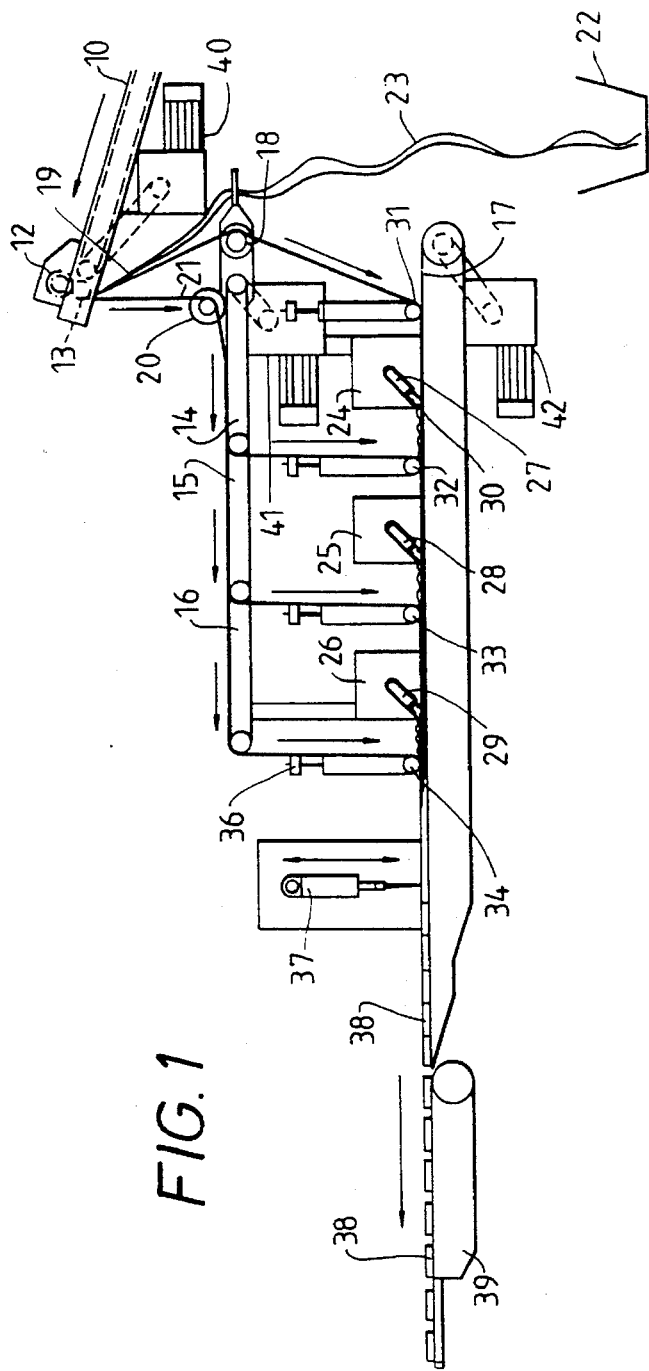
FIG. 1 is a diagrammatic side view of a lasagne producing machine according to the present invention.
Figure 2:
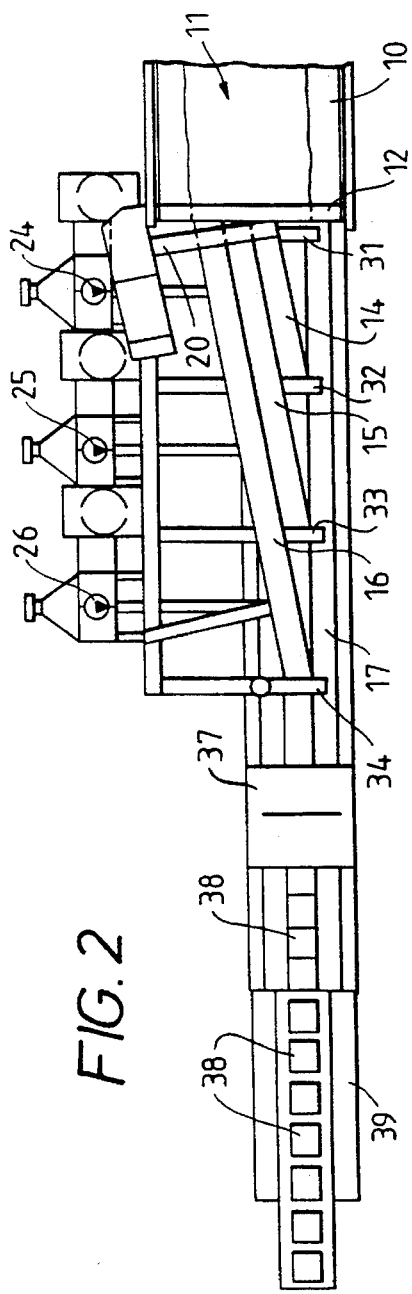
FIG. 2 is a top plan view of the machine shown in FIG. 1.
Figure 3:
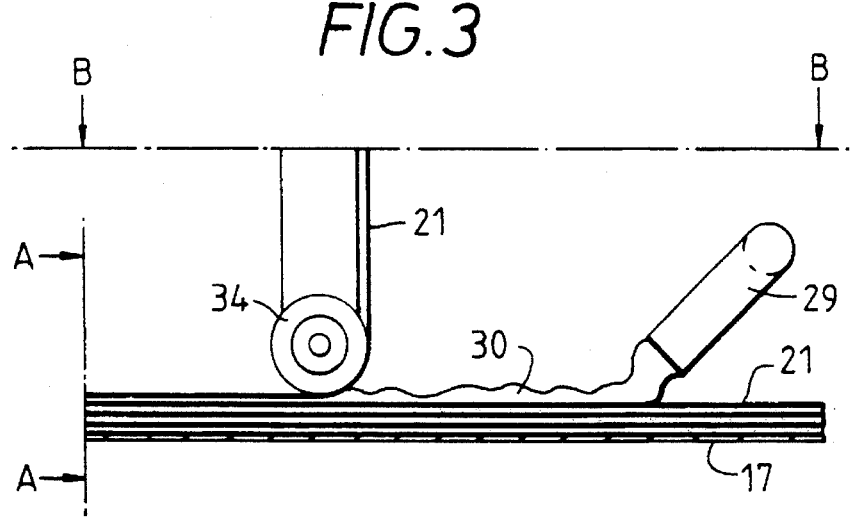
FIG. 3 is a side view of a guiding roller for a pasta strip and a filling nozzle.
Figure 4:
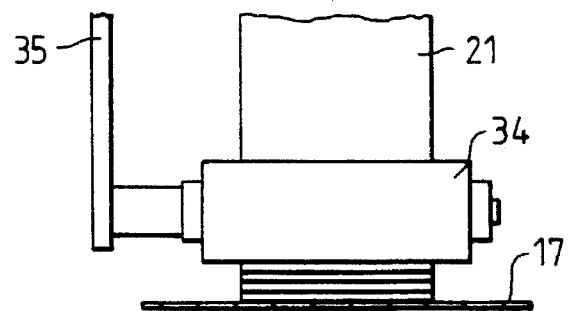
FIG. 4 is a section along the line A—A of FIG. 3 looking in the direction of the arrows.
Figure 5:
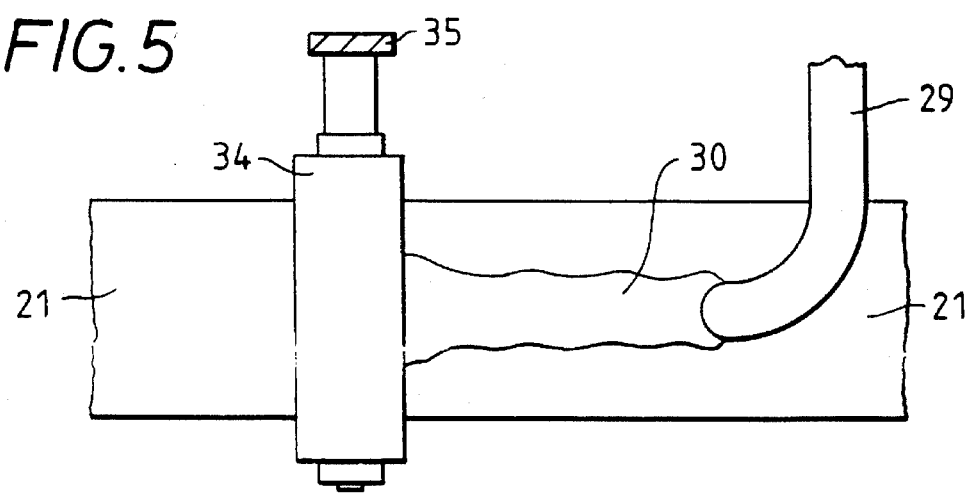
FIG. 5 is a section along the line B—B of FIG. 3 looking in the direction of the arrows.

Referring to the drawings, the machine comprises a cooling conveyor 10 transporting a pasta strand 11. At the downstream end of the cooling conveyor 10 are five rotary cutting knives 12 and a guide roller 13. Below the guide roller 13 are three upper, cross conveyor belts 14, 15 and 16, and a lower conveyor belt 17, the lower conveyor belt having a first, upstream end at a position intermediate of the strip-forming means, knives 12, and its second, downstream end. A guide roller 18 is provided for guiding pasta strip 19 onto the lower, herein also first, conveyor belt 17, and three guide rollers 20 (one for each upper cross conveyor belt, herein also second belt 14, and herein also further belts 15 and 16) are supported on a single shaft and are provided for guiding pasta strips 21 onto the upper cross conveyor belts 14, 15 and 16. A waste bin 22 is provided for receiving scrap pasta cuttings 23.

Filling pumps 24, 25 and 26 provided with filling nozzles 27, 28 and 29 respectively supply a sauce 30. Above the lower conveyor belt are provided calibrating product-forming strip rollers 31, 32, 33 and 34, each mounted on a support 35 vertically adjustable by means of a knob 36. Downstream of the calibrating rollers is a guillotine cutter 37 for cutting the layered pasta strip into lasagnes 38, and the cutter is followed downstream by an acceleration conveyor belt 39. Three electric motors 40, 41 and 42 are provided to drive the cooling conveyor 10, the upper conveyor (comprising cross conveyors 14, 15 and 16), and the lower conveyor 17, respectively.

In operation, a blanched pasta strand 11 is transported on a cooling conveyor 10 beneath the rotary cutting knives 12 which cut the strand into four parallel strips, one of which 19 is trained around and guided by the guiding roller 18 to the lower first conveyor belt 17 where it is trained around the calibrating roller 31 at its upstream end. The other three strips 21 are trained around and guided by the guiding roller 20 to the ends of the upper, cross conveyor belts 14, 15 and 16, respectively. The upper and lower conveyors are driven in synchronisation with the cooling conveyor by a motor (not shown).

Sauce 30 is fed from the nozzle 27 onto the upper surface of the pasta strip 19 transported downstream on the lower conveyor 17. When the pasta strip 19 with the sauce on top is transported to a position below the downstream end of the upper cross conveyor 14, the pasta strip 21 transported downstream on the upper cross conveyor 14 is transported and delivered off the downstream end and is trained around the calibrating roller 32 so that it comes to lie upon the layer of sauce which has been fed onto the transported strip 19 to give a two-layered pasta product. The calibrating roller 32 adjusts the thickness of the layers with the sauce filling between.

Sauce 30 is then fed from nozzle 28 onto the upper surface of the two-layered pasta product, and when the two-layered pasta product is transported to a position beneath the downstream end of the upper cross conveyor 15, the pasta strip 21 transported on the upper conveyor 15 is transported and delivered off the downstream end and is trained around the calibrating roller 33 so that it comes to lie upon the layer of sauce which has been fed onto the upper surface of the transported two-layered pasta product to give a three-layered pasta product. The calibrating roller 33 adjusts the thickness of the layers with the sauce filling between.

Sauce 30 is then fed from nozzle 29 onto the upper surface of the three-layered pasta product, and when the three-layered pasta product is transported to a position beneath the downstream end of the upper cross conveyor 16, the pasta strip 21 transported on the upper conveyor 16 is transported and delivered off the downstream end and is trained around the calibrating roller 34 so that it comes to lie upon the layer of sauce which has been fed onto the upper surface of the transported three-layered pasta product to give a four-layered pasta product. The calibrating roller 34 adjusts the thickness of the layers with the sauce filling between.

The four-layered pasta product is then transported downstream so that it passes beneath the guillotine cutter 37 which reciprocates and cuts the four-layered pasta strip transversely into individual lasagnes 38 which are then transferred to an acceleration belt 39 which spaces them from one another for further processing.

We claim:

1. A machine for layering strips of food material comprising:

means for forming a plurality of parallel strips of flexible food material;

a first conveyor belt which extends from a first end to a second end and which is positioned for receiving a first strip from the strip-forming means for transporting the first strip and so that the first end is at a position intermediate of the strip-forming means and the second end;

a second conveyor belt which is positioned above the first conveyor belt and for receiving a second strip from the strip-forming means for transporting the second strip and which extends to an end at a position displaced from the strip-forming means and above the first conveyor belt between the first conveyor belt first and second ends for delivering the second strip off of the second conveyor belt towards the first conveyor belt;

first guiding means for guiding the plurality of strips from the strip-forming means for delivery to the conveyor belts so that the first strip is delivered on the first conveyor belt and so that the second strip is delivered on the second conveyor belt;

means connected with the first conveyor belt and to the second conveyor belt for powering and advancing each conveyor belt to transport the strips in a direction away from the strip-forming means; and product-forming strip guiding means for guiding the second strip delivered by the second conveyor belt end so that the delivered strip is deposited to lie over the transported first strip for forming a layered food product transported by the first conveyor belt.

2. A machine according to claim 1 further comprising a further conveyor belt which is connected with the powering and advancing means, which is positioned above the first conveyor belt and parallel to the second conveyor belt and for receiving a further strip from the strip-forming means and first guiding means, and which extends to an end at a position displaced from the strip-forming means for strip transport and delivery and wherein the first, second and further conveyor belts extend so that the further conveyor belt delivery end is positioned between the second conveyor belt delivery end and the first conveyor belt second end at a position above the first conveyor belt for delivering the further strip off of the further conveyor belt delivery end towards the first conveyor belt and further comprising a further product-forming strip guiding means for guiding the further strip delivered by the further conveyor belt delivery end so that the further delivered strip is deposited to lie over the transported layered product second strip for forming a further layered food product transported by the first conveyor belt.

3. A machine according to claim 2 wherein there are a plurality of the further conveyor belts and of the further product-forming strip guiding means wherein the further conveyor belts extend and are positioned with the further product-forming guiding means so that each further conveyor belt delivers one further strip to one of the further product-forming-strip guiding means and wherein the first, second and further conveyor belts extend so that the further conveyor-belt-delivery ends are positioned between the first conveyor belt second end and the second conveyor belt delivery end at positions differing one from another for delivering and guiding a plurality of further strips so that the plurality of further strips are deposited sequentially to lie over the transported layered product second strip and one another for forming the further layered food product.

4. A machine according to claim 3 wherein there are from one to four further conveyor belts.

5. A machine according to claim 4 wherein the strip-forming means is suitable for forming from three to six strips.

6. A machine according to claim 1 wherein the first guiding means are rollers.

7. A machine according to claim 1 wherein the product-forming strip guiding means is a roller.

8. A machine according to claim 1 further comprising means positioned between the first conveyor belt first end and the product-forming strip guiding means for depositing a filling upon the transported first strip.

9. A machine according to claim 8 wherein the product-forming strip guiding means is a calibrating roller adjustable and positioned for controlling the thickness of the filling.

10. A machine according to claim 2 further comprising means positioned for depositing a filling on the first strip and on the second strip of the layered product transported on the first conveyor belt so that the filling is deposited on the first strip prior to deposit of the second strip and so that the filling is deposited on the second strip prior to deposit of the further strip.

11. A machine according to claim 3 further comprising means positioned for depositing a filling on the first strip and on the second strip and on at least one further strip of the layered product transported on the first conveyor belt so that the filling is deposited on the first strip prior to deposit of the second strip, so that the filling is deposited on the second strip prior to deposit of one further strip and so that the filling is deposited on at least one further strip prior to deposit of an additional further strip.

12. A machine according to claim 2 further comprising means positioned between the first conveyor belt first end and the product-forming strip guiding means for depositing a filling on the transported first strip and means positioned between the two product-forming strip guiding means for depositing a filling on the transported layered product second strip.

* * * * *

UNITED STATES PATENT AND TRADEMARK OFFICE
CERTIFICATE OF CORRECTION

PATENT NO. : 5,509,350
DATED : April 23, 1996
INVENTOR(S) : Lars Askman et al

It is certified that error appears in the above-indentified patent and that said Letters Patent is hereby corrected as shown below:

On the title page, Item [56] Reference Cited:

```
--4,001,721    5/1978    Cosmi
  4,560,840    2/1986    Codino
  4,711,165   12/1987    Codino
  4,899,650    2/1990    Larsen
  Df 23,433   11/1990    Codino
  5,077,072   12/1991    Sieradzki
  5,120,315    7/1992    Burwell, et al.
  5,216,943    6/1993    Pertozzi
  5,120,315    7/1992    Burwell, et al.--.
```

Signed and Sealed this

Twelfth Day of November, 1996

Attest:

BRUCE LEHMAN

Attesting Officer          Commissioner of Patents and Trademarks